May 28, 1974   G. A. LATINEN   3,813,369
CONTINUOUS MASS POLYMERIZATION PROCESS
Filed May 25, 1972   4 Sheets-Sheet 1

United States Patent Office 3,813,369
Patented May 28, 1974

3,813,369
CONTINUOUS MASS POLYMERIZATION PROCESS
George A. Latinen, deceased, late of Springfield, Mass., by May V. Latinen, administratrix, Springfield, Mass., assignor to Monsanto Company, St. Louis, Mo.
Filed May 25, 1972, Ser. No. 256,660
Int. Cl. C08f 1/06
U.S. Cl. 260—80.6
21 Claims

ABSTRACT OF THE DISCLOSURE

An improved process for copolymerizing by continuous mass technique alkenyl nitrile compound(s) with monoalkenyl aromatic compound(s) wherein the capabilities of both using reflux and of achieving unusually high conversion levels with unusually high conversion rates are provided. The process utilizes within a reaction zone a combination of homogeneous mixing and vapor phase removal of monomer to control temperature. Copolymers produced by this process display substantially uniform molecular weight distribution and composition distribution.

BACKGROUND

Heretofore in the art of manufacturing copolymers of monoalkenyl aromatic compounds and lower alkenyl nitrile compounds utilizing continuous mass polymerization, there has been a problem in controlling and achieving heat removal, particularly at higher rates of conversion and higher conversion levels. The problem arises because at high conversions conductive and convective heat transfer rates decline and become insufficient at high conversion rates to achieve uniformity of temperature and conversion throughout a polymerizing mass which is constituted of monomers and polymers (and, possibly, other materials). If the heat transfer rate is not adequate, the conversion rate varies locally in the reaction mass, and consequently, the molecular weight distribution as well as the composition distribution changes in the polymer being formed. Consequently, in continuous mass polymerization processes known to the prior art, there has tended to be a practical upper limitation both on the percent conversion and on the rate of conversion achievable.

In such prior art processes, it has been conventional heretofore, in order to maintain, generally, uniformity of temperature, conversion and composition, to use a diluent. Diluents, however, suffer from the disadvantage that they must usually be removed from the polymerized product before such product is suitable for most end use purposes. Another disadvantage is that diluents tend to reduce the rate of polymerization (or polyrate), although, with a copolymer type such as styrene/acrylonitrile, theoretical maximum polyrates in mass polymerization are characteristically not achieved because of inherent heat transfer and mixing limitations in known equipment. From an efficiency standpoint, diluents can be regarded as materials which reduce the capacity of polymerization equipment in mass polymerization processes.

By the present invention, however, it is suprisingly and unexpectedly possible to achieve simultaneously (1) a higher rate of monomer to polymer conversion, (2) a higher conversion of monomers to polymer, and (3) a greater uniformity of composition in the polymerizing mass of monomers and polymer, compared to the known prior art processes for producing copolymers of monoalkenyl aromatic compounds with alkenyl nitriles. As a result, the copolymers produced by the process of the present invention characteristically have a substantially constant molecular weight distribution and a substantially constant composition distribution (both of which are relatively narrow distributions). While copolymers of monoalkenyl aromatic compounds and lower alkenyl nitrile compounds with such narrow distribution characteristics are well known to the prior art, it is believed that such copolymers have never heretofore been produced or producible under virtually steady state conditions using continuous mass polymerization at the conversion levels and rates of conversion achievable by utilizing the principles and practice of the present invention. Diluents may be utilized, but generally are not necessary or desirable in practicing the basic principles of the present invention.

In the practice of the process of the present invention, it is possible to employ reflux condensation to control temperature and pressure in the reaction zone at substantionally constant values. Indeed, substantially isothermal conditions prevail throughout the reaction zone. So far as can be determined from the prior art, it has never heretofore been possible to employ reflux condensation (or, broadly, vapor removal) in a continuous mass polymerization process for the manufacture of copolymers of monoalkenyl aromatic compounds and alkenyl nitrile compounds without adversely broadening either or both the molecular weight distribution and the composition distribution in the resulting copolymer product. Such a broadening of distributions is undesirable, generally speaking, because it reduces physical strength characteristics, increases the haze and the yellowness in product polymer, and thereby narrows the range of utilities for which the product copolymer is suitable. By the practice of the present invention, however, reflux condensation is used to make copolymers having narrow distributions (as indicated above).

In the practice of the process of the present invention, mixing conditions in the reaction zone are employed which maintain the contents of such zone during continuous mass polymerization in a substantially homogeneous condition at all times, independent of viscosity of the fluid phase of the reaction system in the reaction zone. Such homogeneity has been exceedingly difficult to attain in the prior art because of the characteristically high viscosities associated with high conversion rates and high conversion levels in polymerizing monoalkenyl aromatic compounds and lower alkenyl nitrile compounds. Even relatively small variations in compositional homogeneity of materials in the reaction zone have been found to adversely affect desired narrow molecular weight distribution and composition distribution in the resulting copolymer product. To gain such compositional homogeneity, in accordance with the practice of the present invention, it has been found preferable to employ a particular type of mixing action, as more particularly hereinafter explained and described. While especially useful with high viscosity reaction systems, this mixing action is suitable generally for the practice of the present invention over wide viscosity ranges.

It is an object of the present invention to provide a continuous mass polymerization process for making copolymers of at least one monalkenyl aromatic compound with at least one alkenyl nitrile compound.

It is an object of the present invention to provide a process for making copolymers of monoalkenyl aromatic compounds and alkenyl nitrile compounds which have a substantially constant molecular weight distribution and a substantially constant composition distribution.

It is an object of the present invention to make such copolymers at high monomer to polymer conversion rates and at high conversion levels.

It is an object of the present invention to make such copolymers in a reaction zone with continuous mass polymerization conditions using a substantially uniform composition distribution throughout the reacting mass of monomers and polymers.

It is an object of the present invention to make such copolymers under such conditions using vapor removal to remove heat of reaction and regulate temperature of such reacting mass.

It is an object of the present invention to utilize a combination of continuous reflux condensation and uniform, complete, continuous mixing in the continuous mass polymerization of monoalkenyl aromatic compound/alkenyl nitrile compound copolymers.

It is an object of the present invention to maintain substantially isothermal conditions in the reaction zone of a continuous mass polymerization reaction.

It is an object of the present invention to provide a process whereby one can easily and effectively manufacture non-azeotropic mono alkenyl aromatic compound/alkenyl nitrile copolymers.

It is an object of the present invention to provide a process utilizing a Latinen-type mixer/reactor for making copolymers of the styrene/alkenyl nitrile type which have minimal haze and yellowness.

It is an object of the present invention to provide a process of making a fluid product containing a low percentage of unreacted monomers and a high percentage of copolymer of alkenyl nitrile and monoalkenyl aromatic compound so as to reduce the cost of removing unreacted monomers from such copolymer.

Other and further objects will occur to those skilled in this art from a reading of the present specification together with the drawings.

GENERAL SUMMARY

The present invention is directed to an improved continuous mass polymerization process for making copolymers which utilizes a starting monomer composition comprising, on a 100 total weight percent basis, from about 1 to 99 weight percent of at least one monoalkenyl aromatic compound and, conversely, from about 99 to 1 weight percent of at least one alkenyl nitrile compound.

The alkenyl nitrile compounds are characterized by the general formula:

(1)

wherein R is selected from the group consisting of hydrogen and alkyl radicals containing from one through 4 carbon atoms each.

The monoalkenyl aromatic compounds are characterized by the general formula:

(2)

wherein

Ar is selected from the group consisting of a phenyl radical, an alkaryl radical of 6 through 9 carbon atoms, a monochlorophenyl radical, a dichlorophenyl radical, a monobromophenyl radical, and a dibromophenyl radical, and X is selected from the group consisting of hydrogen and an alkyl radical containing less than three carbon atoms.

This unit process is adapted to produce copolymers characterized by having a weight average molecular weight ranging from about 20,000 to 1,000,000, dispersion index of from about 2.0 to 3.5, a substantially constant molecular weight distribution, and a substantially constant composition distribution. The process is conducted in a reaction zone wherein the temperature ranges from about 100 to 180° C. and the associated corresponding pressure ranges from about 5 to 150 p.s.i.g.

In practicing this process, one continuously charges said monomer composition to a reaction zone and one continuously maintains in said reaction zone a reaction system comprising a liquid phase with a vapor phase generally thereabove. Such liquid phase generally fills said reaction zone to an extent of from about 10 to 95 percent by volume and comprises said monomer composition as a solvent having substantially completely dissolved therein copolymer formed from said monomer composition. Such vapor phase generally fills the balance up to 100 percent by volume of said reaction zone and comprises said monomer composition, the exact composition of said vapor phase being in substantial equilibrium with the exact composition of said liquid phase. One continuously subjects said reaction system in said reaction zone to mixing action sufficient to maintain a substantially uniform composition distribution throughout said liquid phase in said reaction zone.

From said reaction zone, one continuously removes said vapor phase from said reaction zone. This vapor is removed at a rate sufficient, in combination with any heat of reaction being absorbed in said reaction zone by said charging of said monomer composition, and in combination with any heat of reaction being removed from said reaction zone through peripheral boundaries or walls thereof, to maintain in said reaction zone a substantially constant temperature and a corresponding substantially constant pressure within the respective temperature and pressure ranges above specified.

Additionally, from said reaction zone, one continuously removes said liquid phase from said reaction zone at a rate sufficient to maintain the above specified volume of said liquid phase therein.

The said charging is conducted at a rate substantially equal to the total rate at which monomers are polymerized in said reaction zone and removed from said reaction zone. Additionally, said charging is conducted so that the ratio of total alkenyl nitrile compounds to total monoalkenyl aromatic compounds is such that both a substantially constant said monomer composition is effectively maintained in said liquid phase in said reaction zone and the copolymer formed from said monomer composition is dissolved in said liquid phase.

Various of the above steps are interrelated. Thus, the interrelationship between said charging, said liquid phase removal, and said substantially constant temperature and corresponding substantially constant pressure in said reaction zone is such that:

(a) The weight percentage of said copolymer in said liquid phase in said reaction zone is maintained at a substantially constant value which is sufficient to make the viscosity of said liquid phase be below about 1,000,000 centipoises measured at said constant temperature in said reaction zone and at 10 reciprocal seconds shear rate (herein simply "sec.$^{-1}$"), and (b) The rate at which said copolymer is formed from said monomer composition in said reaction zone ranges from about 0.05 to 2.0 (preferably 0.1 to 1.0) pounds of said copolymer produced per pound of said liquid phase per hour, though larger or smaller rates are sometimes advantageous. The interrelationship in said reaction zone between said mixing action and said vapor phase removal is such that said reaction system is maintained under substantially isothermal conditions.

Further, the interrelationship between said charging, said vapor phase removal, and said reaction zone being such that:

(1) At least about 10 percent of the heat of reaction is removed from said reaction zone by said vapor phase removal, (2) Up to about 90 percent of the heat of reaction is absorbed by said charging, and (3) Up to about 50 percent of the heat of reaction is removed through the peripheral boundaries of said reaction zone through heat transfer. The limits on the respective quantities of heat of reaction removed by one of these three techniques are variable over wide ranges, depending upon individual circumstances, especially type and size of equipment as those skilled in the art will appreciate. Usually and typically, not more than about 200 percent of the heat of reaction is removed through vapor phase removal (for example, by reflux condensation), not less than about 5 percent is removed through charging absorption, and not more than about 25 percent is removed through heat transfer through reaction zone peripheral boundaries. In one preferred mode of operating at steady state conditions, the heat of reaction removed through vapor phase removal ranges from about 25 to 45 percent, the heat of reaction removed through absorption by charging ranges from about 55 to 75 percent, and the heat of reaction removed through reaction zone peripheral boundaries (e.g., a reactor wall) ranges from about −10 to +10 percent. Percentages over 100 percent indicate heat being removed at a greater rate than being generated; percentages under 0 (negative values) indicate heat input, as by heat transfer.

By the practice of the present invention, heat of reaction removal is so efficient through vapor phase removal that it is sometimes convenient and desirable to operate by having peripheral boundaries of the reaction zone at a somewhat higher temperature than the interior thereof, since such a heat input drives vapor phase removal in the direction of superior temperature control of the reaction zone interior. In one more preferred mode of operating, about ⅓ of the heat of reaction is removed through vapor phase removal and the remaining ⅔ approximately is removed through charging absorption with substantially none being removed through the peripheral boundaries of the reaction zone.

In prefered modes of practicing this invention, the vapor phase removed as above indicated is condensed and returned to the reaction zone (as by a reflux condensation) so as to constitute thereby a portion of the monomer composition charged to this zone. Preferably, the charging is accomplished by spraying, as in an atomized form, the monomer composition into the reaction zone.

Preferably, the process is practiced so that, as under virtual steady state conditions, the weight percentage of copolymer in the liquid phase in the reaction zone is at least about 35. More preferably, this weight percentage of copolymer ranges from about 50 to 80 with conversion rates of at least about 0.5 lbs. copolymer/lb. liquid phase/hr. Preferably, the process is so practiced that the viscosity of such liquid phase ranges from about 50,000 to 150,000 centipoises at the constant temperature of the reaction zone and at 10 sec.$^{-1}$.

It has been found to be a convenient and even preferred mode of operation to continuously charge, as with monomer composition, a chain transfer agent to the reaction zone. Such agents and their use are well known to those skilled in the art and include mercaptans, dimercaptides, organic thio acids, terpene derivatives and terpinic materials, hydrocarbon liquids, halogenated hydrocarbons, and the like, of which a preferred such agent is terpinolene. A suitable continuous charging rate falls in the range of from about 0.01 to 2 weight percent based on total monomer composition charged.

One may continuously charge a conventional solvent liquid into the reaction zone. Such is convenient when slight chain transfer action is desired, as may be observed, for example, with ethyl benzene in making copolymers having a low (less than 50 weight percent) alkenyl nitrile compound content. A polar solvent such as methyl ethyl ketone, is conveniently used making copolymers having a low monoalkenyl aromatic compound content. Any suitable solvent liquid known to the art may be used but is not preferred, since such must usually be removed after polymerization. A convenient charging rate falls in the range of from about .01 to 15 weight percent based on total monomer composition charged chosen so as to keep the quantity of solvent liquid in the reaction zone at a substantially constant value or level.

Optionally, sometimes one may desired to introduce, as a part of the monomer composition charged to the reaction zone a copolymerizable monomer, such as an acrylate, a methacrylate, a maleate, a fumarate, a vinyl ether, and the like. A monomer composition can contain up to about 20 weight percent based on total monomer composition charged of such an added monomer. Optionally, sometimes one may desire to have present in a reaction zone other non-monomeric non-participating (as respects the process of the present invention) additives, such as lubricants, stabilizers, antioxidants, colorants, dyes, plasticizers, fungicides, insecticides, brighteners, fillers, modifiers, extenders, and the like. While up to 15 or 20 or even more percent of a copolymer product can contain such additive(s), it is preferred to have the liquid phase withdrawn from the reaction zone contain less than about 5 weight percent (total weight basis) thereof comprise such, in the interest of maximizing process efficiency.

Sometimes one may desire to introduce, as a part of the monomer composition, a polymerization initiator. A suitable continuous charging rate ranges from about 0.005 to 1 weight percent based on total monomer composition charged. Such agents and their use are well known to those skilled in the art and include organic peroxides, hydroperoxides, organic azo nitriles, persulfates, percarbonates, perborates, silane peroxides, and the like, of which preferred initiator is diteritary butyl peroxide.

Styrene/acrylonitrile copolymers are one type of preferred polymers for manufacture by the present process, especially those which comprise on a 100 weight percent basis from about 5 to 85 weight percent acrylonitrile and, correspondingly, from about 15 to 95 weight percent styrene. Styrene/methacrylonitrile copolymers are another type of polymer suitable for manufacture by the present process, especially those comprising on a 100 weight percent basis from about 60 to 95 weight percent methacrylonitrile and, correspondingly, from about 5 to 40 weight percent styrene. Still another type of polymer suitable for manufacture by the present process contains styrene, acrylonitrile and methacrylonitrile, for example, from about 5 to 40 weight percent styrene, from about 40 to 70 weight percent acrylonitrile, and from about 5 to 30 weight methacrylonitrile on a 100 total weight basis. Those skilled in the art will appreciate readily that more than one alkenyl nitrile compound and more than one monoalkenyl aromatic compound may be used in a starting monomer composition when practicing the present invention. Preferably, copolymers produced by the present invention are separated from unreacted monomer composition on an idustrial scale using at least one stage of wiped film devolatilization.

Preferably, the present invention is practiced using a mixer reactor of the type disclosed in co-pending application Ser. No. 172,059, filed Aug. 16, 1971 in the name of George A. Latinen, now U.S. Pat. 3,751,010, which, among other things, produces a type of mixing action which is much preferred for use in the present invention (as more fully hereinafter described). It is preferred to use mixing conditions in a reaction zone which generate and maintain substantially laminar flow in the liquid phase.

Monomer compositions utilized in a reaction zone boil in the range of from about 75 to 200° C. at 760 mm. Hg, and preferably in the range of from about 75 to 170° C. Individual monomers may be charged to a reaction zone individually or in admixture with other materials charged to a reaction zone.

DRAWINGS

The present invention is better illustrated by reference to the attached drawings wherein.

Figure 1:
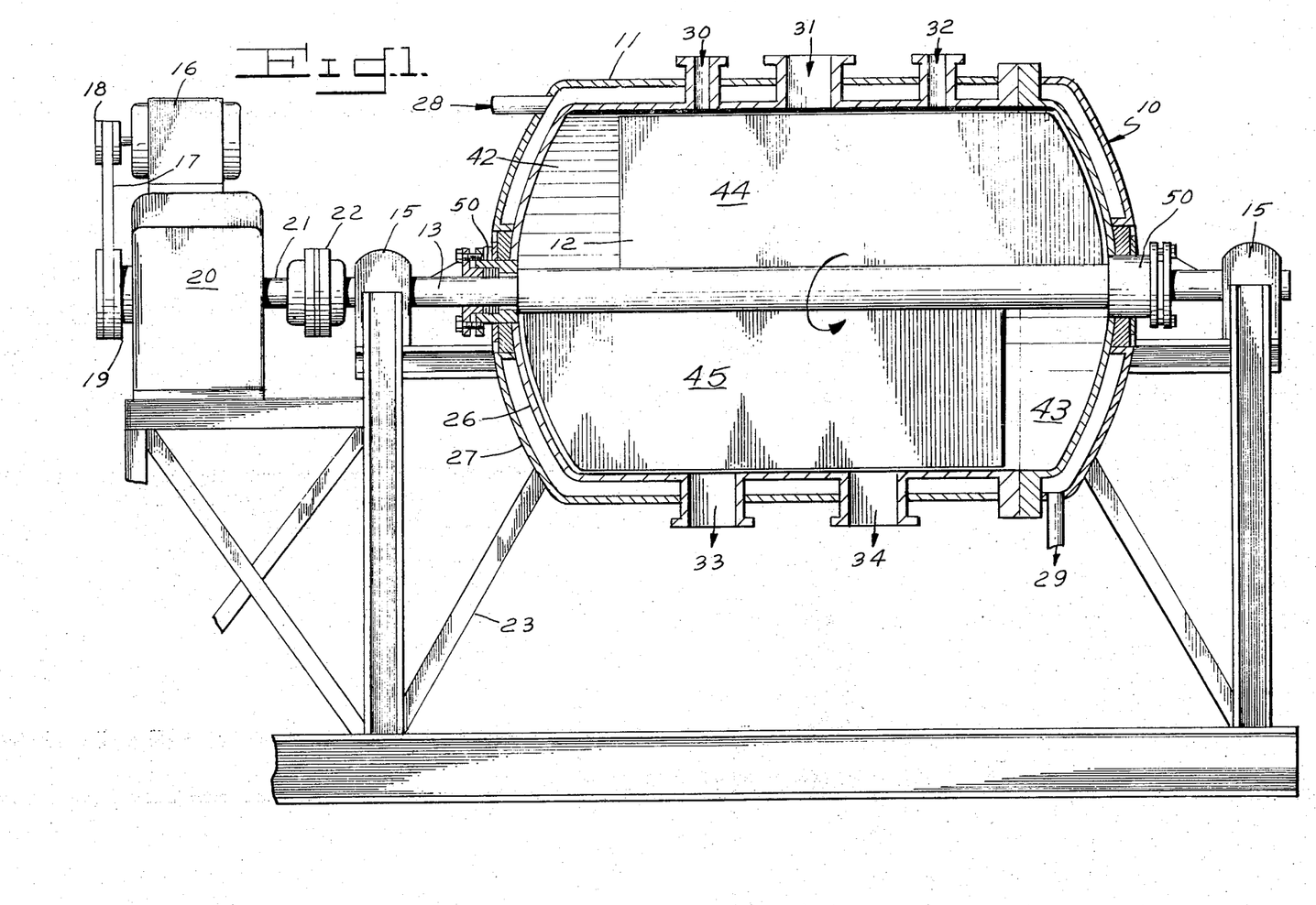
FIG. 1 is a diagrammatic side elevational view of a horizontal continuously stirred mixer/reactor of the type suitable for use in the practice of the present invention.

Referring to FIG. 1, there is seen an embodiment of mixer/reactor assembly of the Latinen type, herein designated in its entirety by the numeral 10, generally formed of steel or the like, which may be employed in the practice of the present invention. Mixer/reactor 10 is seen to comprise a vessel assembly 11 having an impeller assembly 12. Impeller 12 extends through vessel 11 on a shaft 13. Where it passes through vessel 11, shaft 13 is sealed by seals 50 (paired). Shaft 13 is journaled for rotational movements by a pair of bearing assemblies 15.

A motor 16 is connected by a belt 17 over sheaves 18 and 19 to a transmission or reducer 20. Transmission 20 has a drive shaft 21 which interconnects with shaft 13 through a coupling 22. The mixer/reactor assembly 10 is supported by a frame 23.

Vessel 11 has an inner wall 26 and spaced therefrom, an outer wall 27, with the space therebetween serving for circulation therethrough of a heating or cooling fluid, as through input conduits 28 and output conduits 29 (only one each shown). Material for reacting may be fed into vessel 11 through conduits 30, 31 and/or 32 continuously, and material in vessel 11 may be removed therefrom through conduits 33 and/or 34 in conventional ways as those skilled in the art will appreciate. For example, if mixer/reactor 10 is to be used as a reactor for continuous mass polymerization of a monomer mixture such as styrene and acrylonitrile, conduit 31 may be connected to a reflux condenser assembly (not shown); the monomer mixture is continuously sprayed into vessel 11 through a conduit 30, mass polymerized in a partially fluid filled vessel 11, and then continuously removed from vessel 11 through conduit 34, agitation being accomplished by the revolution of impeller 12.

The impeller assembly 12 includes a shaft extending substantially along said longitudinal axis. The impeller or paddle assembly 12 has at least one pair of opposed blade members 44 and 45. Each member 44 and 45 is affixed to said shaft 13 and is generally equally circumferentially spaced one member from another. Each blade member 44 and 45 in the embodiment shown generally radially extends from said shaft to near engagement with interior wall surfaces of vessel 11 and axially extends at least about one-half the length of the chamber in vessel 11 from one end thereof and has at least one discontinuity, therein 42 and 43, respectively in the remaining half thereof. The paddle assembly 12 is adapted to impart to a fluid of relatively high viscosity filling said chamber to an extent of from about 10 to 90 percent by volume during rotational movements of said shaft at angular velocities below the level of turbulent flow in said fluid simultaneously a combination of three types of mixing:

(a) Cyclical vertical displacement of said fluid in said chamber at a cycle rate ranging from about ½ to 60 times per minute, (b) Rolling action in said fluid in a peripherally located, generally horizontally extending region in said chamber which moves normally to the horizontal with a shear rate of at least about 5 sec.$^{-1}$ between said blade members and said chamber, and (c) Horizontal displacement in said chamber in said fluid at an equivalent cycle rate of from about $\frac{1}{10}$ to 30 times the total volume of said fluid in said chamber.

One type involves cyclical vertical displacement in said zone such that, at a cycle rate in the range from about ½ to 60 times per minute, (a) First, said liquid phase is subjected to a vertical lifting force greater than that exerted downwardly thereon by gravity, and at least sufficient to move vertically at least about 10 percent of the total volume of said fluid from a gravitationally lower region to a gravitationally higher region in said zone, and (b) Secondly, such so displaced liquid phase is subjected to a gravitational falling force by effective removal of said lifting force therefrom, the total gravitational falling force applied thereon being at least sufficient to return substantially all of such so displaced liquid phase to said gravitationally lower region before said cycle is repeated on such so displaced liquid.

A second type involves rolling action in a generally peripherally located and generally horizontally extending region in said zone, such region extending circumferentially about the entire internal periphery of said zone, and such region being continuously moving in a direction which is generally normal to the horizontal. This rolling action is produced by a similarly so moving band of pressure located adjacent to, but following behind such region, said band of pressure exerting a force on said liquid phase in said region at least sufficient to cause movement of a portion of said liquid phase in said region along a roughly cross-sectionally circular path normally away from the adjacent internal periphery of said zone adjacent to said band of pressure towards the interior of said zone a distance which is generally less than the maximum distance across said zone at a given peripheral position and then back towards said integral periphery forwardly of said band of pressure before moving towards said band of pressure. A shear rate between said internal periphery and said zone of pressure is maintained at least about 5 sec.$^{-1}$.

The third type involves horizontal displacement in said zone in a longitudinal circulatory manner at a cycle rate such that the actual volume of said liquid phase moved from one end region of said treating zone to the opposite end region thereof and back within one minute is equivalent to from about $\frac{1}{10}$ to 30 times the total volume of said liquid phase in said zone. Such equivalent volume and the horizontal circulation rate for such liquid phase so moved are, respectively, approximately proportional to said cyclical vertical displacement cycle rate in any given instance. Substantially, the total volume of said liquid phase in said zone is continuously maintained under laminar flow conditions during all three types of mixing.

Preferably, mixer/reactor 10 utilizes a vessel 11 having defined therein a chamber which is cylindrical. Preferably, this chamber has dimensions such that the ratio of the axial length of said chamber along longitudinal axis to the maximum chamber diameter ranges from about 0.5 to 3.5. Preferably, the apparatus has paddle blades which are either radially curved or are flattened. Alternatively, the apparatus has paddle blades which are helically curved about the shaft.

A mixer/reactor 10 is adapted to achieve and maintain substantial homogeneity and uniformity in a liquid agitated by paddle assembly 12 and is preferred for use in the practice of the present invention, though those skilled in the art will appreciate that any convenient means may be employed which will provide process conditions as taught and utilized herein for the practice of the present invention.

In the preferred practice of the present invention, a mixer/reactor 10 is equipped with a reflux condenser means and control means. The reflux condenser means is conventional, and thus may comprise a shell and tube assembly, which assembly is interconnected with conduit 31 in housing 11. Means for cooling heat exchange surface portions of such condenser assembly cause, during operation, vapors removed through conduit 31 to be condensed. Virtually, any conventional reflux condenser may be used here, as those skilled in the art will appreciate. The control means is seen to regulate the quantity of vapor withdrawn from a mixer/reactor 10 into the condenser. The control means typically includes: (1) condition sensing means for sensing temperature and/or pressure in said housing and for generating a signal output representative thereof, (2) variable valve means adapted to regulate the flow of vapor from said chamber into said condenser, and (3) control means responsive to said signal output adapted to operate said variable valve means. Conventional control elements well known to those skilled in the art may be used.

Figure 2:
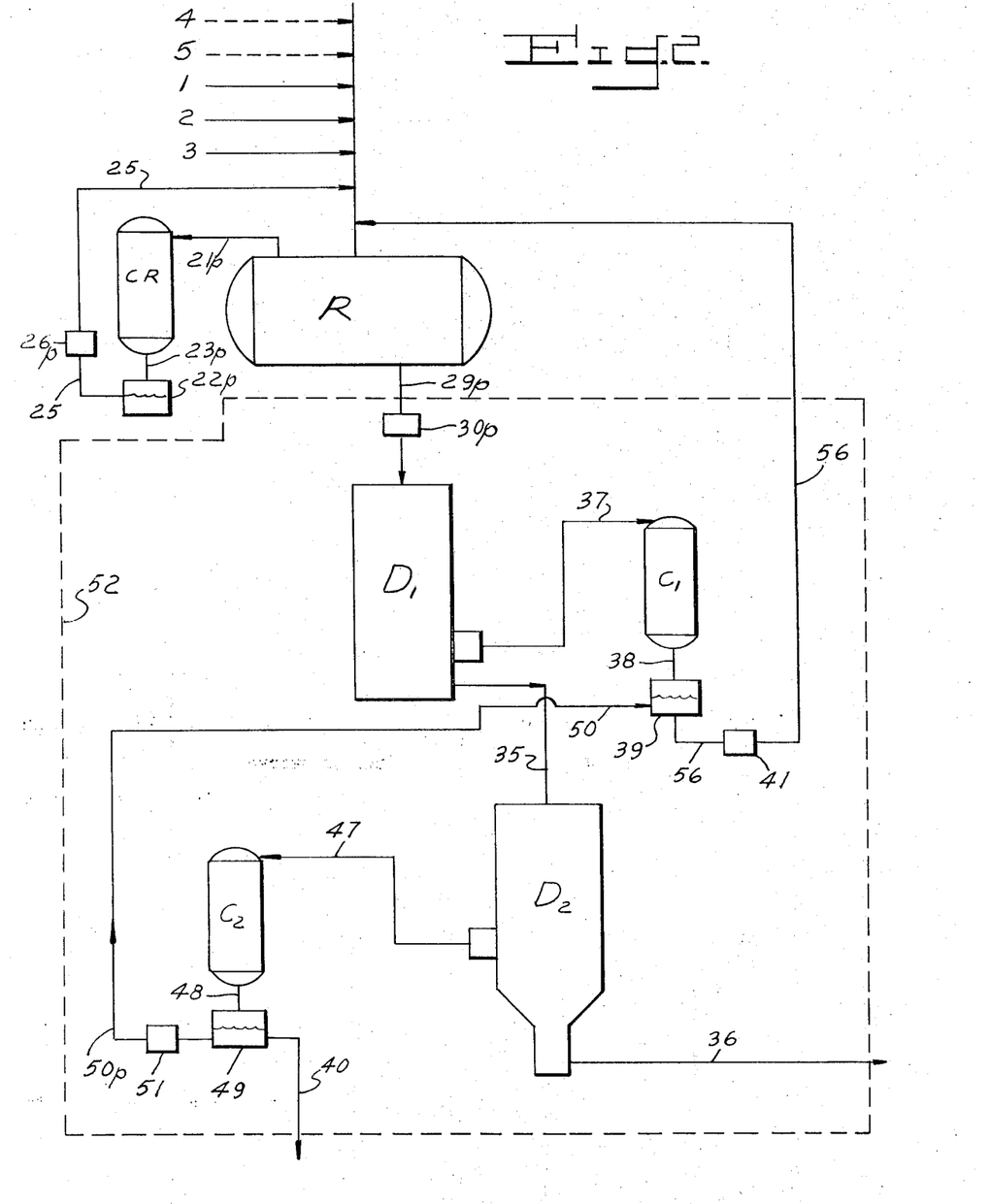
FIG. 2 is a flow diagram of an apparatus assembly incorporating a mixer/reactor of FIG. 1 and suitable for the practice of the process of the present invention.

Turning to FIG. 2, there is seen a simplified flow diagram illustrating one form of polymerization equipment suitable for use in the practice of the polymerization process of the present invention, and in addition illustrating one method of subsequently processing a polymer/monomer mixture produced in accordance with such polymerization process wherein unreacted monomer is separated from polymer product. In FIG. 2, a mixer/reactor of the type shown in FIG. 1 is designated R. Charged to mixer/reactor R on a continuous and controlled basis are: (1) at least one monoalkenyl aromatic compound as through a line 1; (2) at least one lower alkenyl nitrile compound as through a line 2; and (3) optionally, a chain transfer agent as through a line 3. Optionally, some other monomer may be charged to mixer/reactor R as through a line 4, and/or a diluent, initiator, etc. may be charged to mixer/reactor R as through a line 5.

Mixer/reactor R is connected to a reflux condenser CR by means of a pipe 21p. Condensate from condenser CR passes into a receiver 22p through a pipe 23p. The level of condensate in receiver 22p is conventionally controlled or controllable by a conventional level controller (not shown) so that the fluid level in receiver 22p is maintained at a predetermined level by recycling condensate from receiver 22p to mixer/reactor R through line (pipe) 25. In line 25 is functionally mounted a pump 26p whose operation is controlled by the level controller.

The amount of vapor removed from mixer/reactor R is controlled or controllable by a conventional pressure controller (not shown). Thus, for example, this pressure controller can receive an electric signal output from a pressure transducer (not shown) whose sensing element is functionally connected with the vapor space of receiver 22p. This pressure controller operates to control the rate of vapor removal through a valve or valves (not shown) from mixer/reactor R through line 21p. Alternatively, the amount of vapor removed from mixer/reactor R is controlled or controllable by a conventional temperature controller (not shown). Thus, for example, a thermocouple (not shown) located functionally in the mixer/reactor R can feed its signal output to the temperature controller to control the rate of vapor removal through a valve or valves (not shown) from mixer/reactor R through line 21p.

A mixture of polymer and monomer is continuously and controllably withdrawn from the mixer/reactor R through line 29p, as by a pump 30p. The flow rate in line 29p is typically either held constant or controlled in a fashion to maintain the stream in line 56 at a substantially constant flow rate.

The mixture of polymer and monomer from the mixer/reactor R is then typically processed to separate out the polymer. For example, in FIG. 2, this mixture from mixer/reactor R is fed to a devolatilizer D1. Melt from devolatilizer D1 (with typically at least 90 weight percent of the monomer removed therefrom) leaves devolatilizer D1 through pipe 35 and is delivered to a second devolatilizer D2. Melt from devolatilizer D2 (which consists of substantially pure polymer typically containing less than about .5 weight percent monomer) is fed through a pipe 36 to a conventional pelletizer apparatus (not shown). Monomer vapor removed from the polymer in devolatilizer D1 is conducted through line 37 to a condenser C1 and, hence, through a pipe 38 to a receiver 39. From receiver 39, the condensate is conducted through a line 56 by a pump 41 back to the reactor R. Similarly, monomer vapor removed from the polymer in devolatilizer D2 is conducted through line 47 to a condenser C2 and, hence, through a pipe 48 to a receiver 49. From receiver 49, the condensate is either conducted through a line 50p by a pump 51 back to the receiver 39 (and, hence, to the reactor R) or conducted out of the process through a line 40. Condenser C2 may be refrigeratively cooled. Preferred devolatilizers are of the wiped film type. Sometimes a single devolatilizer is sufficient. Conventional equipment may be used here.

The dotted line 52 circumscribes the polymer/monomer recovery system described in FIG. 2. Those skilled in the art will appreciate that any conventional separation means may be used to effectuate such a separation of product polymer produced by the process of the present invention from unreacted monomer. Instead of separating monomer from polymer after the reaction product leaves mixer/reactor R, one may convert all or part of the reaining monomer to polymer, as in a second or subsequent reaction zone (not shown in FIG. 2), for example.

For test or analysis purposes, one can use an appropriately sized test bomb. Typically, such a bomb is conveniently evacuated, interconnected with a process line (here, for example, liquid line 29p), filled with process liquid phase to a desired extent, sealed, removed, quenched, and the bomb contents analyzed. Subsequent processing of product from mixer/reactor R forms no integral feature of the present invention, as those skilled in the art will appreciate.

Figure 3:
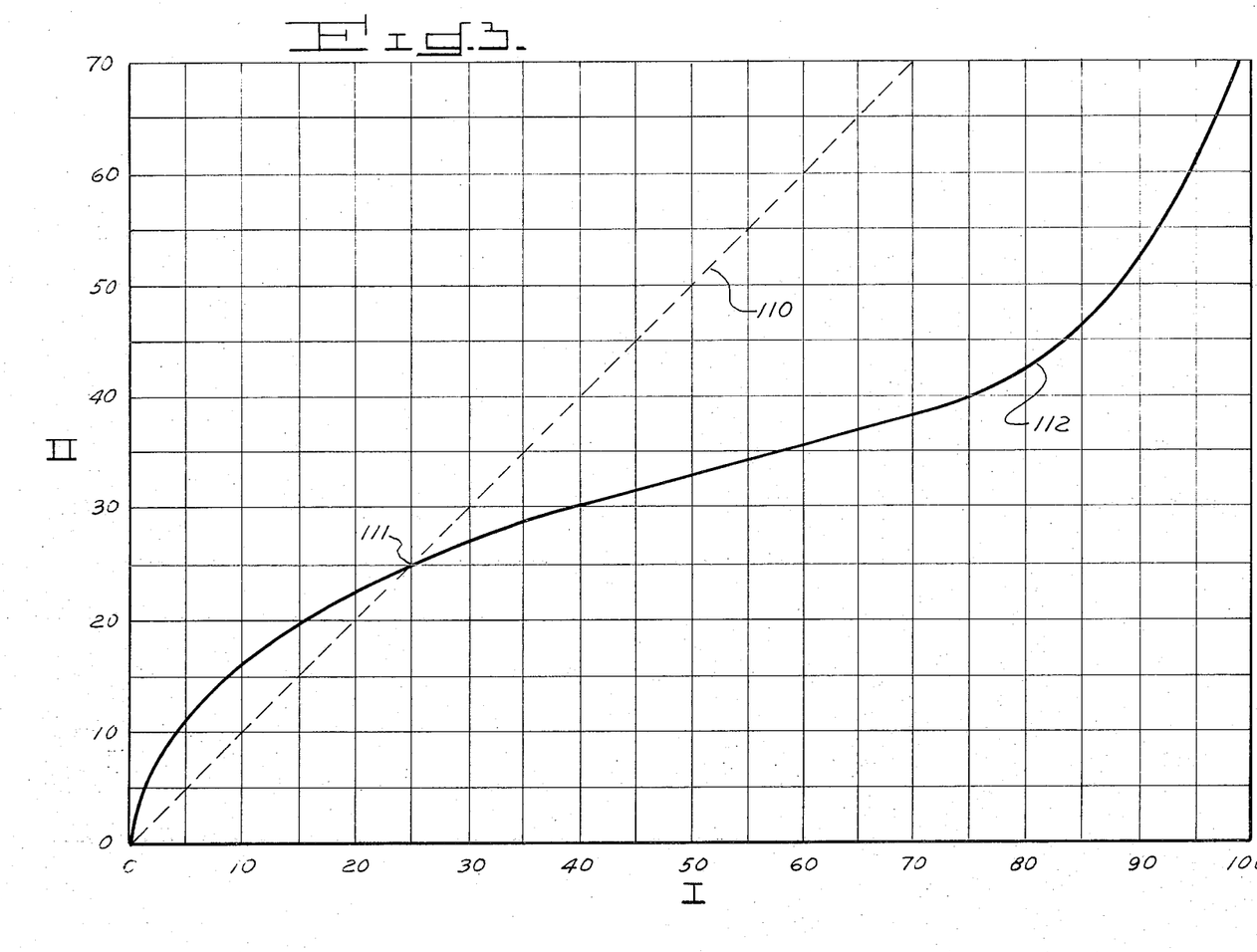
FIG. 3 is a plot showing the relationship between alkenyl nitrile monomer and polymer composition for a typical copolymer (styrene/acrylonitrile) made in accordance with the process of the present invention.

FIG. 3 serves to illustrate a major advantage of the present invention. In this figure, coordinate I designates weight percent acrylonitrile in monomers polymerizing, while coordinate II designates weight percent acrylonitrile in instantaneously forming polymer. The 45° dotted line 110 represents (for illustrative and comparative purposes) a hypothetical copolymer of a comonomer system wherein the composition of the instantaneously forming polymer is always the same as that of the reacting monomers, while the solid line curve 112 designates the actual composition of a styrene/acrylonitrile copolymer formed in the presence of various indicated relative percentages of acrylonitrile for a given monomer composition. Except for the point 111, which is known to those skilled in the art as the monomer/copolymer azeotrope, curve 112, the instantaneous monomer and copolymer compositions are not the same, which is typical for alkenyl nitrile/monoalkenyl aromatic compound copolymers. While the character of curve 112 generally illustrates a wide variety of polymerization conditions, point 111 describes a copolymer composed of approximately 25 weight percent acrylonitrile and 75 weight percent styrene. The exact azeotrope composition at point 111 is somewhat dependent upon exact reaction conditions employed during mass polymerization, a situation which those skilled in the art will appreciate true for many copolymers. Here, when the concentration of acrylonitrile in the monomer composition is below that existing at point 111, the respective compositions of the reacting monomer mixture and of the resultant instantaneously formed copolymer product both tend to go down in acrylonitrile content as conversion increases in a closed system but at different relative rates. On the other hand, when the amount of acrylonitrile present in a monomer composition is greater than that existing at point 111, the weight percentage of acrylonitrile in monomer composition as well as that incorporated into the resulting instantaneously formed copolymer product both tend to rise as polymerization proceeds but at different respective relative rates. As a consequence, except at point 111, when one desires to select and maintain a particular styrene/acrylonitrile monomer composition in which the amount of acrylonitrile present is greater or less than the amount of acrylonitrile desired to be present in the product copolymer, the amount in any given instance being as taught, for example, by FIG. 3, one must continuously feed into, and mix into, the polymerizing mass fresh monomers at controlled ratios (of one monomer to the other) and rates. In other words, the composition of the monomer composition of the polymerizing mass must be carefully regulated in order to produce a copolymer product having a narrow composition distribution. Maintenance of constant composition aids in controlling molecular weight distribution (which is primarily dependent upon temperature and chain transfer agent concentration, and, to a lesser extent, upon conversion). The process of the present invention thus enables one to prepare non-azeotrope copolymers of alkenyl nitrile compounds and monoalkenyl aromatic compounds having narrow and substantially constant molecular weight distribution and narrow and substantially constant composition distributions at high conversion and rates of conversion.

It is a characteristic of styrene/acrylonitrile type copolymers that, if the acrylonitrile content of one styrene/acrylonitrile type copolymer product varies by more than a few percentage points (say, for example, about 5 percent) in acrylonitrile content from a second styrene/acrylonitrile type copolymer, and the first such copolymer is admixed with the second such copolymer and extruded therewith, there is produced a product composition which is hazy in appearance, and which also has poorer physical strength characteristics, than does a single copolymer similarly extruded which has substantially uniform composition and an acrylonitrile content midway between that of said first and said second such copolymers forming such mixture. It is possible that if one so mixes together and extrudes such a first with such a second styrene/acrylonitrile copolymer, there characteristically results an increase in the yellowness of the resulting composition as compared with the yellowness of such a single copolymer similarly extruded (particularly such a single copolymer made at relatively low polymerization temperature). Such characteristics serve to illustrate the importance of producing uniform copolymer products of the type characteristically produced by the practice of the present invention.

In general, as those skilled in the art appreciate, the higher the acrylonitrile content of a particular styrene/acrylonitrile copolymer, the greater the yellowness associated therewith. In fact, as those skilled in the art appreciate, because of this yellowness effect, it is typical and customary in the art at the present time to produce styrene/acrylonitrile type copolymers having an acrylonitrile content generally less than about 50 percent to avoid yellowness, particularly for use in those applications where color is considered critical, and to avoid the loss of certain other physical and optical quantities, so that, even though such high acrylonitrile containing copolymers may be produced by the practice of the present invention, market demand for such in the past has usually been relatively low. Furthermore, depending somewhat upon the particular reaction conditions chosen, when one chooses to practice the present invention using monomer compositions containing high (for example, over about 65 weight percent typically) acrylonitrile, there is a tendency for the product copolymer to precipitate out of the solution of liquid monomers in the reaction zone. This is considered presently to be an undesirable situation since such can result in deposition of copolymer product on the interior walls and surfaces of the reaction zone (the reactor and the agitator therein). Hence, in the absence of a diluent, it is now generally preferred to practice this invention so as to produce a copolymer which contains less than about 50 weight percent acrylonitrile.

When, however, one desires to produce by the practice of the present invention a copolymer product containing methacrylonitrile, it will be appreciated even in the absence of a diluent that the relative weight percentage of methacrylonitrile in the product copolymer can be appreciably greater than about 50 weight percent without objectionable yellowness, haze, or loss of physical properties (compared to, for example, such a copolymer containing less than about 50 weight percent methacrylonitrile). Depending on the choice of process conditions selected for a particular situation (from among those conditions generally specifically taught herein) the loss of solubility of copolymer product in liquid monomer composition in the reaction zone for increasing alkenyl nitrile copolymer contents can be minimized to the point where such does not adversely affect practice of the present process, particularly for relatively short continuous runs. Sometimes a combination of methacrylonitrile and acrylonitrile can be used advantageously in the monomer composition in practicing the present invention to produce the copolymers with monoalkenyl aromatic compounds. The principles of the present invention are advantageous to practice when it is desired to produce such a copolymer product having a substantially uniform content and distribution of alkenyl nitrile in order to obtain a maximum of clarity and a minimum of yellow color, and to produce such a copolymer product at a high level of conversion and conversion rate.

Continuous mass polymerization processes for making copolymers of monoalkenyl aromatic compounds and lower alkenyl nitrile compounds have generally heretofore been operated at conversion levels of less than about 25 or 35 percent (more or less) because of the difficulties of (a) uniformly removing heat from the reaction mass, (b) achieving substantially uniform mixing of monomers with copolymer continuously and independently of how the monomer is introduced into the system or the polymer is removed therefrom, and (c) controlling the temperature (and hence pressure) of the reaction system in the polymerization zone at precise (substantially isothermal) values. However, at low levels of conversion (e.g. below 35 percent), it is necessary to remove from the mixture of copolymer product and unreacted monomers significant amounts of monomer in order to separate out a relatively pure product thermoplast, which, in turn, necessitates not only consumption of large amounts of energy but also the utilization of large (and costly) pieces of equipment to achieve the desired end of monomer removal from polymer product.

Figure 4:
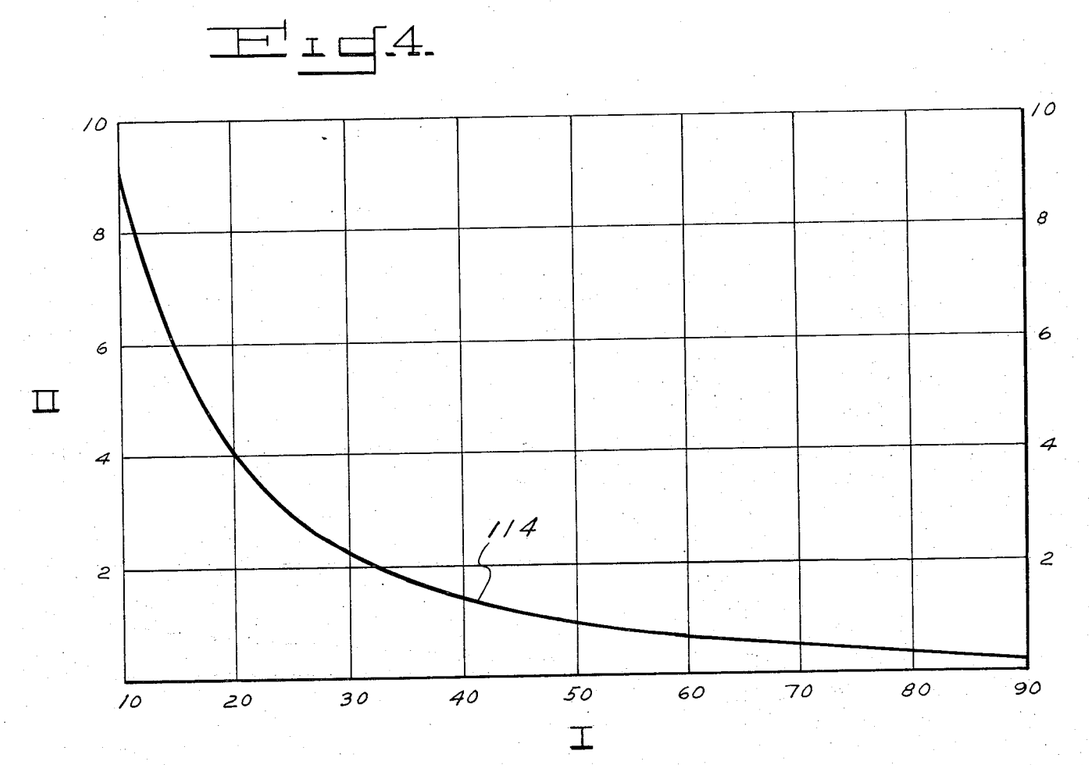
FIG. 4 is a plot showing the relationship between conversion in a continuous mass polymerization of comonomers such as styrene and acrylonitrile, and the monomer/polymer separation load for a typical polymer (styrene/acrylonitrile) copolymer product produced by such continueous mass polymerization.

The undesirability of low conversion levels is illustrated by FIG. 4. In this figure, coordinate I designates the weight percent of styrene/acrylonitrile copolymer in a total reactor effluent fluid, while coordinate II designates the weight (herein pounds) of monomer which must be removed (or reacted) per pound of product copolymer produced, based on total reactor effluent fluid. For example, at a conversion level of about 10 percent, one must remove about nine pounds of monomer per pound of copolymer produced, whereas at a level of conversion of about 50 percent, one must remove only about 1 pound of monomer for each pound of polymer produced. At higher conversion levels, the amount of monomers removed per pound of copolymer produced is seen to be even less. Higher conversion levels greatly reduces the overall costs of removing monomer from polymer product. Such desirably higher conversion levels are readily and conveniently achieved by the practice of the present invention.

As those skilled in the art of chemical engineering will appreciate, reflux condensation can be used to control heat evolved from many exothermic reactions. However, in the case of a continuous mass polymerization in a reaction zone wherein the polymerizing mass of high viscosity fluid comprising monoalkenyl aromatic compound, lower alkenyl compound and a copolymer formed therefrom, the mass heretofore has generally not been uniformly completely, and continuously mixed. Consequently, reflux condensation cannot be used to achieve uniform and constant temperature regulation and control throughout such polymerizing mass, particularly at higher rates of conversion and higher conversion levels where viscosities are greatest. When such reacting mass is less than so completely mixed, reflux concentration does not then produce uniform heat removal or temperature control in such mass because of the existing inherent monomer compositional variations throughout such mass. Uniform, complete, continuous mixing of such mass has been found to eliminate such compositional variations. When reflux condensation is used to control temperature of such a so-mixed mass, surprisingly and unexpectedly very exact and precise regulation and control of the temperature (and pressure) of such mass becomes possible. So far as is now known, no one has heretofore used such a combination of uniform, complete, and continuous mixing with reflux condensation (or, broadly, vapor removal) to achieve continuous mass polymerization of monoalkenyl aromatic compounds and lower alkenyl compounds.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated. In each of these examples, the reaction zone is produced by using a mixer/reactor of the type shown and described above in reference to FIG. 1.

EXAMPLE 1

Continuously charged with the aid of pumps at a temperature of about 60° F. into the upper half of the space of the reaction zone is a liquid monomer stream comprising on a 100 weight percent basis about 70.9 weight percent styrene at a feed rate of 156 pounds per hour and about 29.1 weight percent acrylonitrile at a feed rate of about 64 pounds per hour.

The reaction zone is maintained at about a 65 percent volumetric fillage level based on a substantially non-expanded liquid phase with a vapor thereabove composed of unreacted monomers. Paddle assembly is rotated therein at about 12 r.p.m. which produces mixing action which maintains in the liquid phase a substantially uniform composition distribution.

After start up is completed and substantially steady state operating conditions are reached, the temperature in the reaction zone is maintained at about 280° F. with the pressure therein being about 35 p.s.i.a. The jacket about the reaction zone is fluid filled and the fluid therein is maintained by heat exchange circulation at about 180° F.

A vaporized monomer composition at steady state conditions is continuously withdrawn at a total rate of about 20 pounds per hour from the vapor phase of the reaction zone at a rate sufficient to maintian the temperature in the reaction zone under substantially isothermal conditions at about 280° F. (as indicated above). The so-withdrawn monomer composition is collected and condensed but not returned to the reaction zone. Analysis of the condensate shows it to comprise about 30 weight percent styrene and about 7 weight percent acrylonitrile. The composition of the vapor phase is found to be in substantial equilibrium with the composition of the liquid phase.

The liquid phase is continuously removed at steady state conditions from the bottom, central region of the reaction zone with the aid of a pump at a rate of about 200 pounds per hour which is sufficient to maintain the above-specified volume of fluid in the reaction zone. As this liquid phase is found by analysis to contain substantially completely dissolved therein about 50 weight percent based on total liquid phase of a styrene/acrylonitrile copolymer with the balance up to 100 weight percent thereof comprising a mixture of unreacted styrene and unreacted acrylonitrile monomers. The copolymer comprises about 75 weight percent styrene and about 25 weight percent acrylonitrile and has a weight average molecular weight of about 360,000, a dispersion index of about 2.9. This copolymer has a substantially constant molecular weight distribution and a substantially constant composition distribution. This copolymer is substantially without haze and is pale yellow in appearance. The unreacted monomer composition comprises about 75 weight percent styrene and about 25 weight percent acrylonitrile. The rate of liquid phase removal from the reaction zone is about 200 pounds per hour. The viscosity of the liquid phase is estimated to be about 45,000 centipoises at 280° F. and at 10 sec.$^{-1}$. The rate at which this copolymer is formed from the monomer composition is about 0.46 pounds of copolymer per pound of liquid phase per hour.

At these steady state conditions, about 11.8 percent of the heat of reaction is removed from the reaction zone by the removal of the vapor from the vapor phase, about 61.4 percent of the heat of reaction is absorbed by the monomer being charged, and about 26.8 percent of the heat of reaction is removed by heat exchange through the wall of the reaction zone.

The run is summarized in Tables I and II.

EXAMPLE 2

The equipment utilized in Example 1 is used again except that the operating scheme is altered. Here, about 132.75 pounds per hour of styrene, about 80.75 pounds per hour of acrylonitrile, and about 0.184 pounds per hour of terpinolene are charged to the reaction zone.

The reaction zone is maintained at about a 65 percent volumetric fillage level based on a substantially non-expanded liquid phase with a vapor phase thereabove composed of unreacted monomers. The paddle assembly is rotated therein at about 12 r.p.m. which produces mixing action which maintains in the liquid phase a substantially uniform composition distribution.

After start up is completed and substantially steady state operating conditions are reached, the temperature in the reaction zone is maintained at about 320° F. with the pressure therein being about 52 p.s.i.a. The jacket about the reaction zone is fluid filled, and the fluid therein is maintained by heat exchange circulation at about 320° F. (Optionally, no fluid need be circulated in the jacket.)

At steady state, vapor is removed at a rate of about 60 pounds per hour which comprises about 30 weight percent styrene and about 70 weight percent acrylonitrile. The composition of the vapor phase is found to be in substantial equilibrium with the composition of the liquid phase.

The liquid phase removed contains substantially completely dissolved therein about 65.4 weight percent styrene/acrylonitrile copolymer, with the balance up to 100 weight percent thereof comprising a mixture of unreacted styrene and unreacted acrylonitrile monomers. The copolymer comprises about 75 weight percent styrene and about 25 weight percent acrylonitrile and has a weight average molecular weight of about 235,000, a dispersion index of about 2.7. This copolymer has a substantially uniform molecular weight distribution and a substantially uniform composition distribution. This copolymer is substantially without haze and is pale yellow in appearance.

The unreacted monomer composition comprises about 75 weight percent styrene and about 25 weight percent acrylonitrile. The rate of liquid phase removal from the reaction zone is about 153 pounds per hour. The viscosity of the liquid phase is estimated to be about 25,000 centipoises at 320° F. and at 10 sec.$^{-1}$. The rate at which this copolymer is formed from the monomer composition is about 0.55 pounds of copolymer per pound of liquid phase per hour.

At steady state conditions, about 28.3 percent of the heat of reaction is removed from the reaction zone by the removal of the vapor from the vapor phase, about 70.7 percent of the heat of reaction is absorbed by the monomer being charged, and about 1 percent of the heat of reaction is removed by heat exchange through the wall of the reaction zone.

This run is summarized in Tables I and II below.

EXAMPLE 3

Continuously charged with the aid of pumps at a temperature of about 60° F. by spraying into the upper, central region of the reaction zone are styrene at the rate of about 114.75 pounds/hour, acrylonitrile at the rate of about 38.25 pounds/hour, and terpinolene at the rate of about 0.184 pounds/hour. Conditions like those of Example 2 are used.

A vaporized monomer composition at steady state conditions is continuously withdrawn from the vapor phase of the reaction zone at a rate sufficient to maintain the temperature in the reaction zone under substantially isothermal conditions at about 320° F. (as indicated above). The so-withdrawn monomer composition is collected and condensed and is returned to the reaction zone. The so-condensed vapor is collected and subcooled to about 60° F. before being returned to the reaction zone at a rate substantially equal to the vapor removal rate of about 60 pounds per hour. Analysis of the condensate shows it to comprise about 30 weight percent styrene and about 70 weight percent acrylonitrile. The composition of the vapor phase is found to be in substantial equilibrium with the composition of the liquid phase.

Continuously removed at steady state conditions from the bottom, central region of the reaction zone with the aid of a pump at a rate sufficient to maintain the above-specified volume of fluid in the reaction zone is the liquid phase which is found by analysis to contain substantially completely dissolved therein about 65.4 weight percent based on total liquid phase of a styrene/acrylonitrile copolymer with the balance up to 100 weight percent thereof comprising unreacted styrene and unreacted acrylonitrile monomers. The copolymer comprises about 75 weight percent styrene and about 25 weight percent acrylonitrile and has a weight average molecular weight of about 235,000, a dispersion index of about 2.7, a substantially constant molecular weight distribution, and a substantially constant composition distribuion. This copolymer is substantially without haze and is pale yellow in appearance. The unreacted monomer composition comprises about 75 weight percent styrene and about 25 weight percent acrylonitrile. The rate of liquid phase removal from the reaction zone is about 153 pounds per hour. The viscosity of the liquid phase is estimated to be about 25,000 centipoises at 320° F. and at 10 sec.$^{-1}$. The rate at which this copolymer is formed from the monomer composition is about 0.55 pounds of copolymer per pound of liquid phase per hour.

At steady state conditions, about 28.3 percent of the heat of reaction is removed from the reaction zone by the removal of the vapor from the vapor phase, about 70.7 percent of the heat of reaction is absorbed by the monomer being charged, and about 1 percent of the heat of reaction is removed by heat exchange through the wall of the reaction zone.

The run is summarized in Tables I and II.

EXAMPLE 4

Continuously charged with the aid of pumps at a temperature of about 60° F. by spraying into the upper, central region of the reaction zone are fresh styrene at the rate of about 77.6 pounds/hour, acylonitrile at the rate of about 25.4 pounds/hour, and terpinolene at the rate of about 0.078 pounds/hour.

The reaction zone is maintained at about a 65 percent volumetric fillage level based on a substantially non-expanded liquid phase with a vapor phase thereabove composed of unreacted monomers. The paddle assembly is rotated therein about 12 r.p.m. which produces mixing action which maintains in the liquid phase a substantially uniform composition distribution.

After start up is completed and substantially steady state operating conditions are reached, the temperature in the reaction zone is maintained at about 320° F. with the pressure therein being about 52 p.s.i.a. The jacket about the reaction zone is fluid filled, and the fluid therein is maintained by heat exchange circulation at about 320° F. (Optionally, no fluid need be circulated in the jacket.)

A vaporized monomer composition at steady state conditions is continuously withdrawn from the vapor phase of the reaction zone at a rate of about 60 pounds per hour which is sufficient to maintain the temperature in the reaction zone under substantially isothermal conditions at about 320° F. (as indicated above). The so-withdrawn monomer composition is collected and condensed and is returned to the reaction zone. The so-condensed vapor is collected and subcooled to about 60° F. before being returned to the reaction zone at a rate substantially equal to the vapor removal rate. Analysis of the condensate shows it to comprise about 30 weight percent styrene and about 70 weight percent acrylonitrile. The composition of the vapor phase is found to be in substantial equilibrium with the composition of the liquid phase.

Continuously removed at steady state conditions from the bottom, central region of the reaction zone with the aid of a pump at a rate sufficient to maintain the above-specified volume of fluid in the reaction zone is the liquid phase which is found by analysis to contain substantially completely dissolved therein about 65.4 weight percent based on total liquid phase of a styrene/acrylonitrile copolymer with the balance up to 100 weight percent thereof comprising unreacted styrene and unreacted acrylonitrile monomers. The copolymer comprises about 75 weight percent styrene and about 25 weight percent acrylonitrile and has a weight average molecular weight of about 235,000, a dispersion index of about 2.7, a substantially constant molecular weight distribution, and a substantially constant composition distribution. This copolymer is substantially without haze, and is pale yelow in appearance. The unreacted monomer composition comprises about 75 weight percent styrene and about 25 weight percent acrylonitrile. The rate of liquid phase removal from the reaction zone is about 153 pounds per hour. The viscosity of the liquid phase is estimated to be about 25,000 centipoises at 320° F. and at 10 sec.$^{-1}$. The rate at which this copolymer is formed from the monomer composition is about 0.55 pounds of copolymer per pound of liquid phase per hour.

The liquid phase removed from the reaction zone is passed continuously through two successive stages of devolatilization to remove unreacted monomer from copolymer product. The resulting hot melt of polymer is extruded, quenched and pelletized. The pellets are pale yellow in color and substantially without haze.

The vapors removed during such devolatilization are condensed, sub-cooled to about 60° F., collected, and returned to the reaction zone. Composition and flow rates are: styrene, about 37.15 pounds per hour, acrylonitrile, about 12.95 pounds per hour, and terpinolene, about 0.106 pounds per hour; for recycled condensate.

At steady state conditions, about 28.3 percent of the heat of reaction is removed from the reaction zone by the removal of the vapor from the vapor phase, about 70.7 percent of the heat of reaction is absorbed by the monomer being charged, and about 1 percent of the heat of reaction is removed by heat exchange through the wall of the reaction zone.

The run is summarized in Tables I and II below.

EXAMPLE 5

The general procedure of Example 4 is repeated. The run is summarized in Tables I and II below.

EXAMPLE 6

The general procedure of Example 4 is repeated except that here vapor is removed from the reaction zone and returned thereto after condensation but without subcooling using a so-called knock-back type reflux condenser. The run is summarized in Tables I and II.

EXAMPLE 7

The general procedure of Example 4 is repeated except that methacrylonitrile is used as the alkenyl nitrile, and, in place of terpinolene, an initiator (ditertiary butyl peroxide) is continuously charged. The run is summarized in Tables I and II.

EXAMPLE 8

The general procedure of Example 4 is repeated except that here the feed of monoalkenyl aromatic compounds comprises styrene and alpha-methyl styrene, and the feed of alkenyl nitrile compounds comprises acrylonitrile and methacrylonitrile. The run is summarized in Tables I and II.

EXAMPLE 9

The general procedures of Example 8 is repeated except that here ethyl benzene and methyl ethyl ketone are charged with monomers to the reaction zone. The run is summarized in Tables I and II below.

EXAMPLES 10 THROUGH 13

The general procedure of Example 3 is used, except as indicated. The runs are summarized in Tables I and II below.

In each of the runs of Examples 5–13, the copolymers produced are characterized by having a weight average molecular weight in the range from about 100,000 to 400,000, a dispersion index of from about 2.0 to 3.5, a substantially constant molecular weight distribution, and a substantially constant composition distribution.

EXAMPLE 14

When the general procedure of Example 3 is repeated, but by adding to the monomer feed composition an additional 10 weight percent (based on total monomer composition) of a chlorinated styrene system comprising primarily ortho and para chloro substituted styrene (but including some dichlorosubstituted species), there is produced a copolymer type product by the process of this invention which has a weight average molecular weight in the range from about 100,000 to 700,000, a dispersion index of from about 2.0 to 3.5, a substantially constant molecular weight distribution, and a substantially constant composition distribution.

Similar results are achieved using an analogous brominated styrene system.

Styrene and alpha-methyl styrene are preferred monoalkenyl aromatic compounds for use in the present invention, and acrylonitrile and methacrylonitrile are preferred alkenyl nitrile compounds for use in the present invention.

TABLE I.—PART A

Total feed to reactor (reaction zone)

| | Fresh materials | | | | | Reflux condenser condensate [6] | | | Devolatilization vapor condensation [7] | | | |
|---|---|---|---|---|---|---|---|---|---|---|---|---|
| | | Charge | | | Charge | | Charge | | | Charge | | Comments |
| Ex. No. | Monomer | Rate, lbs./hr. | Temp., °F. | Additive | Rate, lbs./hr. | Temp., °F. | Component | Rate, lbs./hr. | Temp., °F. | Component | Rate, lbs./hr. | Temp., °F. | (footnote no.) |
| 1 | Styrene / AN [8] | 156 / 64 | 60 / 60 | (None) | | | None | | | None | | | |
| 2 | Styrene / AN [8] | 132.75 / 80.25 | 60 / 60 | Terpinolene | 0.184 | 60 | ...do... | | | ...do... | | | ([2]) |
| 3 | Styrene / AN [8] | 114.75 / 38.25 | 60 / 60 | ..do.. | 0.184 | 60 | Styrene / AN [8 15] | 18 / 42 | 60 | ...do... | | | |
| 4 | Styrene / AN [8] | 77.6 / 25.4 | 60 / 60 | ..do.. | 0.078 | 60 | Styrene / AN [8 15] | 18 / 41.9 | 60 | Styrene / AN [8] / Terpinolene | 37.15 / 12.95 / 0.106 | 60 | ([3]) |
| 5 | Styrene / AN [8] | 64 / 32.8 | 60 / 60 | ..do.. | 0.10 | 60 | Styrene / AN [8 15] | 6 / 33.8 | 60 | Styrene / AN [8] / Terpinolene | 17 / 24.4 / ------ | 60 | ([4]) |
| 6 | Styrene / AN [8] | 73 / 22 | 60 / 60 | ..do.. | 0.038 | 60 | Styrene / AN [8 15] | 48.6 / 37.4 | 300 | Styrene / AN [8] / Terpinolene | 34.5 / 0.5 / 0.192 | 60 | ([1]) |
| 7 | Styrene / MAN [10] | 0.6 / 5.46 | 60 | DTBP [9] | 0.0152 | 60 | Styrene / MAN [10 16] | 0.05 / 7.98 | 282 | Styrene / MAN [10] | 0.12 / 2.17 | 60 | ([8]) |
| 8 | Styrene / AN [8] / AMS [11] / MAN [10] | 77.6 / 25.4 / 328×10⁻⁴ / 30.7×10⁻⁴ | 60 / 60 / 60 / 60 | Terpinolene | 0.078 | 60 | Styrene / AN [8 17] | 18 / 41.9 | 60 | Styrene / AN [8] / Terpinolene / AMS [11] / MAN [10] | 37.15 / 12.95 / 0.106 / 400×10⁻⁴ / 10×10⁻⁴ | 60 | ([10]) |
| 9 | Styrene / AN [8] / AMS [11] / MAN [10] | 77.6 / 25.4 / 328×10⁻⁴ / 30.7×10⁻⁴ | 60 / 60 / 60 / 60 | Terpinolene / Ethyl benzene / MEK [12] | 0.078 / 0.065 / 0.04 | 60 / 60 / 60 | Styrene / AN [8 16] / MEK [11] | 18 / 41.9 / ------ | 60 | Styrene / AN [8] / Terpinolene / AMS [11] / MAN [10] | 37.15 / 12.95 / 0.106 / 400×10⁻⁴ / 10×10⁻⁴ | 60 | ([20]) |

See footnotes at end of table.

TABLE I.—PART A—Continued

Total feed to reactor (reaction zone)

| Ex. No. | Fresh materials | | | Reflux condenser condensate [6] | | | Devolatilization vapor condensation [7] | | | Comments (footnote no.) |
|---|---|---|---|---|---|---|---|---|---|---|
| | Monomer | Charge Rate, lbs./hr. | Temp., °F. | Additive | Charge Rate, lbs./hr. | Temp., °F. | Component | Charge Rate, lbs./hr. | Temp., °F. | Component |
| 10 | Styrene / MAN | 1.27 / 9.73 | 60–70 | Ionol [13] / DTBP [9] | 0.011 / 0.0275 | 60–70 | FN 14 | | | (14). |
| 11 | Styrene / MAN | 0.495 / 10.505 | 60–70 | Ionol / DTBP | 0.011 / 0.0088 | 60–70 | FN 14 | | | (14). |
| 12 | Styrene / MAN | 0.345 / 7.305 | 60–70 | Ionol / DTBP / Cyclohexanone | 0.0077 / 0.0061 / 1.355 | 60–70 | FN 14 | | | 14 |
| 13 | Styrene / MAN | 0.33 / 5.67 | 60–70 | Ionol / DTBP | 0.006 / 0.006 | 60–70 | FN 14 | | | 14 |

[1] Reflux condenser of knock-back type and the condensate is not sub-cooled. Losses in the devolatilization system estimated to be about 3.5 pounds/hr. of styrene, about 5.5 pounds/hr. of acrylonitrile, and about 0.038 pounds/hr. of terpinolene as purge and as combined into copolymer product. Air leak in condenser here causes high acrylonitrile loss from separation zone.

[2] Small amounts of water enter reaction zone with the fresh acrylonitrile and is easily controlled at low levels in the reaction zone by removal of water with vapor taken off from reaction zone, and separated from reflux condenser receiver.

[3] The recycle stream may contain small quantities of dimers, trimers, and other species which tend to go with the separated monomers in devolatilization. About a 0.1 pound/hr. acrylonitrile loss occurs from the reflux condensation system, and also about a 2.6 pound/hr. styrene, about a 0.3 pound/hr. acrylonitrile, and about a 0.078 pound/hr. terpinolene combined loss of material from the devolatilization (separation) system as purge and in product.

[4] Here, there is observed about a 0.2 pounds/hr. acrylonitrile loss from reflux condensation, about 0.6 pounds/hr. acrylonitrile loss from separation as purge or in copolymer product, about 2.0 pounds per hour styrene loss from separation as purge or in copolymer product, and about a 0.1 terpinolene loss from separation as purge or in the copolymer product.

[5] Reflux condenser of knock-back type and the condensate is not sub-cooled. About a 0.06 pound/hr. loss of methacrylonitrile is observed in the separation (devolatilization) process as purge and in product.

[6] Vapor removed from reaction zone at temperature thereof (see Table II) condensed and returned to reaction zone. Reflux flow rates and compositions for the examples employing knock-back reflux (Ex. 6 and Ex. 7) have been estimated from measured heat loads and vapor liquid equilibrium data.

[7] Vapor collected from two stages of wiped film devolatilization, condensed, sub-cooled, collected, and recycled to reaction zone.

[8] AN designates acrylonitrile.

[9] DTBP designates ditertiary butyl peroxide.

[10] MAN designates methacrylonitrile.

[11] AMS designates alpha-methyl styrene.

[12] MEK designates methyl ethyl ketone.

[13] Ionol is a trademark of the Shell Chemical Company for 2,6-ditertiary-butyl-4-methyl phenol. (Term used herein for convenience in identifying this antioxidant additive.)

[14] Reflux condenser used of knock-back type and condensate is not sub-cooled. From this condenser, the charge rate and composition of condensate returned to reaction zone not determined. Also, composition and removal rate of vapor phase leaving reaction zone not determined.

[15] Trace quantities of terpinolene are present in the vapor phase and, consequently, also in the condensate thereof.

[16] Trace quantities of di-tertiary-butyl peroxide are present in the vapor phase, and, consequently, also in the condensate thereof.

[17] Trace quantities of terpinolene, alpha-methyl styrene, and methacrylonitrile are present in the vapor phase and, consequently, also in the condensate thereof.

[18] Trace quantities of terpinolene, alpha-methyl styrene, methacrylonitrile, and ethyl benzene are present in the vapor phase, and, consequently, also in the condensate.

[19] Losses in this Example 8 are the same as those in Example 4 but with the addition of a loss of 28×10⁻⁴ lbs./hr. of alphamethyl styrene and 0.7×10⁻⁴ lbs./hr. of methacrylonitrile, both losses occurring in the separation system.

[20] Losses in this Example 9 are the same as those of Example 8 with the additional loss of 0.065 lbs./hr. of ethyl benzene and 0.03 lbs./hr. loss of methyl ethyl ketone from the separation system, an 0.01 lb./hr. loss of methyl ethyl ketone from the reflux system.

TABLE I.—PART B

Total effluent from reactor (reaction zone)

| Liquid phase | | | | | Vapor phase | | |
|---|---|---|---|---|---|---|---|
| Low molecular weight component | Lbs./hr. removal rate | Copolymer | Lbs./hr. removal rate | Total effluent rate | Component | Lbs./hr. removal rate | Ex. No. |
| Styrene / Acrylonitrile | 75 / 25 | 75/25 S/AN | 100 | 200 | Styrene / Acrylonitrile | 6 / 14 | 1 |
| Styrene / Acrylonitrile / Terpinolene | 39.75 / 13.25 / 0.164 | 75/25 S/AN | 100 | 153 | Styrene* / Acrylonitrile | 18 / 42 | 2 |
| Styrene / Acrylonitrile / Terpinolene | 39.75 / 13.25 / 0.104 | 75/25 S/AN | 100 | 153 | Styrene* / Acrylonitrile | 18 / 42 | 3 |
| Styrene / Acrylonitrile / Terpinolene | 39.75 / 13.25 / 0.104 | 75/25 S/AN | 100 | 153 | Styrene* / Acrylonitrile | 18 / 42 | 4 |
| Styrene / Acrylonitrile / Terpinolene | 39.75 / 13.25 / 0.104 | 75/25 S/AN | 100 | 153 | Styrene* / Acrylonitrile | 18 / 42 | 5 |
| Styrene / Acrylonitrile / Terpinolene | 38 / 6 / 0.22 | 81/19 S/AN | 86 | 130 | Styrene* / Acrylonitrile | 48.6 / 37.4 | 6 |
| Styrene / MAN | 0.12 / 2.23 | MAN/S | 6.0 | 8.35 | Styrene / MAN | 0.05 / 7.98 | 7 |
| Styrene / Acrylonitrile / Terpinolene / AMS / MAN | 39.75 / 13.25 / 0.104 / 428×10⁻⁴ / 10.7×10⁻⁴ | S/AN/AMS/MAN | 100 | 153 | Styrene / Acrylonitrile | 18 / 42 | 8 |
| Styrene / Acrylonitrile / Terpinolene / AMS / MAN / Ethyl benzene / MEK | 39.75 / 13.25 / 0.104 / 428×10⁻⁴ / 10.7×10⁻⁴ / 0.965 / 1.325 | S/AN/AMS/MAN | 100 | 155 | Styrene / Acrylonitrile / MEK | 18 / 42 / 4.2 | 9 |
| Styrene / MAN | 0.47 / 5.03 | MAN/S | 5.5 | | | | 10 |
| Styrene / MAN | 0.09 / 6.51 | MAN/S | 4.4 | | | | 11 |
| Styrene / MAN / Cyclohexanone | 0.045 / 4.2 / 1.35 | MAN/S | 3.4 | | | | 12 |
| Styrene / MAN | 0.17 / 3.13 | MAN/S | 2.4 | | | | 13 |

*See footnote 15, Table I, Part A.

TABLE II

| Example number | Mw [1] | DI [2] | Visc. [3] | Percent conv. [4] | °F. [5] | P [6] | Rate [7] | Vapor [8] | Charge [9] | Jacket [10] | Percent AN [11] | MAN [12] | S [13] | AMS [14] |
|---|---|---|---|---|---|---|---|---|---|---|---|---|---|---|
| 1 | 74,700 | 2.6 | 10,000 | 68 | 326 | 82 | 67 | 40.8 | 60.5 | (1.3) | 34 | | 66 | |
| 2 | 235,000 | 2.7 | 25,000 | 65.4 | 320 | 52 | 55 | 28.3 | 70.7 | 1.0 | 25 | | 75 | |
| 3 | 235,000 | 2.7 | 25,000 | 65.4 | 320 | 52 | 55 | 28.3 | 70.7 | 1.0 | 25 | | 75 | |
| 4 | 235,000 | 2.7 | 25,000 | 65.4 | 320 | 52 | 55 | 28.3 | 70.7 | 1.0 | 25 | | 75 | |
| 5 | 360,000 | 2.9 | 45,000 | 50 | 280 | 35 | 46 | 11.8 | 61.4 | 26.8 | 25 | | 75 | |
| 6 | 289,000 | 2.5 | 30,000 | 66 | 300 | 35 | 45 | 48.6 | 48.0 | 3.4 | 19 | | 81 | |
| 7 | 250,000 | 2.0 | 100,000 | 72 | 282 | 64 | 27 | 70.0 | 27.8 | 2.2 | | 90 | 10 | |
| 8 | 235,000 | 2.7 | 25,000 | 65.4 | 320 | 52 | 55 | 28.3 | 70.7 | 1.0 | 24.997 | 0.003 | 74.97 | .03 |
| 9 | 235,000 | 2.7 | 25,000 | 64.5 | 320 | 52 | 55 | 29.9 | 72.6 | (2.5) | 24.997 | 0.003 | 74.97 | .03 |
| 10 | 137,000 | 1.83 | 200,000 | 50.0 | 290 | 64 | 25 | 50.4 | 49.6 | 0.0 | | 85.2 | 14.8 | |
| 11 | FN 15 | FN 15 | 100,000 | 40.0 | 305 | 58 | 22 | 33.5 | 66.5 | 0.0 | | 90.7 | 9.3 | |
| 12 | FN 15 | FN 15 | 100,000 | 44.0 | 305 | 52 | 20 | 30.2 | 69.8 | 0.0 | | 91.4 | 8.6 | |
| 13 | 170,000 | 1.89 | 150,000 | 45.0 | 296 | 53 | 13.5 | 37.8 | 62.2 | 0.0 | | 92.0 | 8.0 | |

[1] Weight average molecular weight.
[2] Dispersion index.
[3] Viscosity in centipoises at indicated temperature of reaction zone and at 10 sec.⁻¹.
[4] Weight percent polymer in the reacting mixture.
[5] Temperature in the reaction zone (substantially isothermal conditions).
[6] Pressure in the reaction zone measured in pounds/sq. in. absolute.
[7] Conversion rate in pounds of product per pound of hold up per hour ×100.
[8] Percent of heat of reaction removed by vapor removal from the reaction zone.
[9] Percent of heat of reaction removed by heat absorption through sensible heat of materials charged to the reaction zone.
[10] Percent of heat of reaction removed (or added as indicated) by jacket heat exchange.
[11] Weight percent acrylonitrile in copolymer product.
[12] Weight percent methacrylonitrile in copolymer product.
[13] Weight percent styrene in copolymer product.
[14] Weight percent alpha-methyl styrene in copolymer product.
[15] Not available.

What is claimed is:

1. In an improved process for continuous mass polymerization of a monomer composition comprising, on a 100 total weight percent basis, from about 1 to 99 weight percent of at least one alkenyl nitrile compound of the formula:

wherein R is selected from the group consisting of hydrogen and alkyl radicals containing from one through 4 carbon atoms each, and, conversely, from about 99 to 1 weight percent of at least one monoalkenyl aromatic compound of the formula:

wherein:
Ar is selected from the group consisting of a phenyl radical, an alkaryl radical of 6 through 9 carbon atoms, a monochlorophenyl radical, a dichlorophenyl radical, a monobromophenyl radical, and a dibromophenyl radical, and
X is selected from the group consisting of hydrogen and an alkyl radical containing less than three carbon atoms, said monomer composition boiling at 760 mm. Hg in the range of from about 75 to 200° C., said process being adapted to produce copolymers characterized by having a weight average molecular weight ranging from about 20,000 to 1,000,000, a dispersion index of from about 2.0 to 3.5, a substantially constant molecular weight distribution, and a substantially constant composition distribution, said process being conducted in a stirred reaction zone wherein the temperature ranges from about 100° to 180° C., and the pressure ranges from about 5 to 150 p.s.i.a., the improvement which comprises practicing in combination the steps of:

(A) continuously charging to said reaction zone monomers to result in a said monomer composition in said reaction zone, (B) continuously maintaining in said reaction zone a reaction system comprising a liquid phase with a vapor phase generally thereabove,
  (1) said liquid phase filling said reaction zone to an extent of from about 10 to 95 percent by volume and comprising said monomer composition as a solvent having substantially completely dissolved therein copolymer formed from said monomer composition,
  (2) said vapor phase filling the balance up to 100 percent by volume of said reaction zone, the exact composition of said vapor phase being in substantial equilibrium with the exact composition of said liquid phase, (C) continuously subjecting said reaction system in said reaction zone to mixing action sufficient to maintain a substantially uniform composition distribution throughout said liquid phase in said reaction zone, (D) continuously removing said vapor phase from said reaction zone at a rate sufficient to maintain, in combination with any heat of reaction being absorbed in said reaction zone by said charging of monomers and with any heat of reaction being removed from said reaction zone through the peripheral boundaries thereof, in said reaction zone a substantially constant temperature and a corresponding substantially constant pressure within the respective temperature and pressure ranges above specified, (E) continuously removing said liquid phase from said reaction zone at a rate sufficient to maintain the above specified volume of said liquid phase, (F) said charging additionally being conducted:
  (1) at a rate substantially equal to the total rate at which monomers are polymerized in said reaction zone, and removed from said reaction zone, and
  (2) in a ratio of total alkenyl nitrile compounds to total monoalkenyl aromatic compounds such that both a substantially constant said monomer composition is effectively maintained in said liquid phase in said reaction zone and copolymer formed from said monomer composition is dissolved in said liquid phase, (G) the interrelationship between said charging, said liquid phase removal, and said substantially constant temperature and corresponding substantially constant pressure in said reaction zone being such that:
  (a) the weight percentage of said copolymer in said liquid phase in said reaction zone is maintained at a substantially constant value of at least about 35 percent which is sufficient to make the viscosity of said liquid phase be below about 1,000,000 centipoises measured at said constant temperature in said reaction zone and at 10 sec.⁻¹ shear rate, and
  (b) the rate at which said copolymer is formed from said monomer composition in said reaction zone ranges from about .05 to 2.0 pounds of said copolymer produced per pound of said liquid phase per hour, (H) the interrelationship in said reaction zone between said mixing action and said vapor phase removal being such that said reaction system is maintained under substantially isothermal conditions, (I) the interrelationship between said charging, said vapor phase removal, and said reaction zone being such that:
(1) at least about 10 percent of the heat of reaction is removed from said reaction zone by said vapor phase removal,
(2) up to about 90 percent of the heat of reaction is absorbed by said charging, and
(3) up to about 50 percent of the heat of reaction is removed through the peripheral boundaries of said reaction zone through heat transfer.

2. The process of claim 1 wherein said vapor phase so removed is condensed and returned to said reaction zone as a portion of monomers so charged thereto.

3. The process of claim 1 wherein the weight percentage of said copolymer in said liquid phase ranges from about 50 to 80.

4. The process of claim 3 wherein the rate of conversion of monomers to copolymer is at least about 0.50 pounds of copolymer produced per pound of said liquid phase per hour.

5. The process of claim 1 wherein the viscosity of said liquid phase ranges from about 50,000 to 150,000 centipoises at said constant temperature and at 10 sec.$^{-1}$ shear rate.

6. The process of claim 1 wherein additionally from about .01 to 2 weight percent of a chain transfer agent, based on total monomer composition charged, is continuously charged to said reaction zone.

7. The process of claim 6 wherein said chain transfer agent is terpinolene.

8. The process of claim 1 wherein additionally from about .01 to 15 weight percent based on total monomer composition charged of a solvent liquid is charged to said reaction zone at a rate sufficient to keep the quantity of said solvent liquid in said reaction zone at a substantially constant value.

9. The process of claim 8 wherein said solvent liquid is ethyl benzene and the copolymer product contains less than about 50 weight percent alkenyl nitrile compound.

10. The process of claim 8 wherein said solvent liquid is methyl ethyl ketone and the copolymer product contains less than about 50 weight percent monoalkenyl aromatic compound.

11. The process of claim 1 wherein the relationship between said charging, said vapor phase removal and said reaction zone being such that:
(1) from about 25 to 85 percent of the heat of reaction is removed from said reaction zone by said vapor phase removal,
(2) from about 15 to 75 percent of the heat of reaction is absorbed by said charging, and
(3) from about minus 10 to 10 percent of the heat of reaction is removed through the peripheral boundaries of said reaction zone through heat transfer.

12. The process of claim 11 wherein the relationship between said charging and said vapor phase removal is such that about ⅓ of the heat of reaction is removed by said vapor phase removal and about the remaining ⅔ of said heat of reaction is removed by said charging.

13. The process of claim 1 wherein additionally from about .005 to 1 weight percent of a polymerization initiator, based on total monomer composition charged, is continuously charged to said reaction zone.

14. The process of claim 13 wherein said initiator is ditertiary butyl peroxide.

15. The process of claim 1 wherein the copolymer produced comprises styrene and acrylonitrile.

16. The process of claim 15 wherein said copolymer comprises on a 100 weight percent basis from about 5 to 85 weight percent acrylonitrile and, correspondingly, from about 15 to 95 weight percent styrene.

17. The process of claim 1 wherein the copolymer produced comprises styrene and methacrylonitrile.

18. The process of claim 17 wherein said copolymer comprises on a 100 weight percent basis from about 60 to 95 weight percent methacrylonitrile and, correspondingly, from about 5 to 40 weight percent styrene.

19. The process of claim 1 wherein the copolymer produced comprises a polymer of from about 5 to 40 weight percent styrene, from about 40 to 70 weight percent acrylonitrile, and from about 5 to 30 weight percent methacrylonitrile on a 100 total weight percent basis.

20. The process of claim 1 wherein the copolymer produced is separated from said monomer composition using at least one stage of wiped film devolatilization.

21. The process of claim 1 wherein said mixing action is produced by subjecting said liquid phase in said reaction zone simultaneously to a combination of:
(1) cyclical vertical displacement in said zone such that at a cycle rate in the range from about ½ to 60 times per minute,
(a) first, said liquid phase is subjected to a vertical lifting force greater than that exerted downwardly thereon by gravity, and at least sufficient to move vertically at least about 10 percent of the total volume of said fluid from a gravitationally lower region to a gravitationally higher region in said zone, and
(b) secondly, such so displaced liquid phase is subjected to a gravitational falling force by effective removal of said lifting force therefrom, the total gravitational falling force applied thereon being at least sufficient to return substantially all of such do displaced liquid phase to said gravitationally lower region before said cycle is repeated on such so displaced liquid,
(2) rolling action in a generally peripherally located and generally horizontally extending region in said zone, said region extending circumferentially about the entire internal periphery of said zone, said region being continuously moving in a direction which is generally normal to the horizontal, said rolling action being produced by a similarly so moving band of pressure located adjacent to, but following behind, said region, said band of pressure exerting a force on said liquid phase in said region at least sufficient to cause movement of a portion of said liquid phase in said region along a roughly cross-sectionally circular path normally away from the adjacent internal periphery of said zone adjacent to said band of pressure towards the interior of said zone a distance which is generally less than the maximum distance across said zone at a given peripheral position and then back towards said internal periphery forwardly of said band of pressure before moving towards said band of presure, there being a shear rate between said internal periphery and said zone of pressure of at least about 5 sec.$^{-1}$,
(3) horizontal displacement in said zone in longitudinal circulatory manner at a cycle rate such that the actual volume of said liquid phase moved from one end region of said treating zone to the opposite end region thereof and back within one minute is equivalent to from about ⅒ to 30 times the total volume of said liquid phase in said zone, such equivalent volume and the horizontal circulation rate for such liquid phase so moved, respectively, being approximately proportional to said cyclical vertical displacement cycle rate in any given instance, while continuously maintaining substantially the total volume of said liquid phase in said zone under laminar flow conditions.

References Cited

UNITED STATES PATENTS 2,974,125   3/1961   Lang et al. _________ 260—80.5

STANFORD M. LEVIN, Primary Examiner

U.S. Cl. X.R.

260—78.5 R, 80.76, 80.77, 80.78, 85.5 P